United States Patent [19]  
Basil et al.

[11] Patent Number: 4,799,963  
[45] Date of Patent: Jan. 24, 1989

[54] OPTICALLY TRANSPARENT UV-PROTECTIVE COATINGS

[75] Inventors: John D. Basil, Pittsburgh; Chia-Cheng Lin, Gibsonia; Robert M. Hunia, Kittanning, all of Pa.

[73] Assignee: PPG Industries, Inc., Pittsburgh, Pa.

[21] Appl. No.: 914,857

[22] Filed: Oct. 3, 1986

[51] Int. Cl.⁴ .................... C09K 3/00; C04B 14/00
[52] U.S. Cl. ................... 106/287.13; 106/287.12; 106/287.14; 106/287.16; 106/287.18; 106/287.17; 106/287.24; 106/439; 106/450; 106/481; 106/499
[58] Field of Search .............. 106/287.12, 287.14, 106/287.16, 287.24, 287.17, 287.13, 287.18, 299

[56] References Cited

U.S. PATENT DOCUMENTS

| 3,582,395 | 6/1971 | Adams et al. | 428/412 |
| 3,941,719 | 9/1973 | Yoldas | 242/463 |
| 3,944,658 | 3/1976 | Yoldas | 423/626 |
| 3,986,999 | 10/1976 | Clark | 260/292 |
| 4,027,073 | 5/1977 | Clark | 428/412 |
| 4,208,475 | 6/1980 | Paruso | 429/193 |
| 4,242,403 | 12/1980 | Mattimue et al. | 428/213 |
| 4,271,210 | 6/1981 | Yoldas | 427/169 |
| 4,275,118 | 6/1981 | Baney | 428/412 |
| 4,278,632 | 7/1981 | Yoldas | 264/66 |
| 4,286,024 | 8/1981 | Yoldas | 428/446 |
| 4,293,594 | 10/1981 | Yoldas | 427/163 |
| 4,346,131 | 8/1982 | Yoldas | 428/428 |
| 4,357,427 | 11/1982 | Ho | 501/153 |
| 4,390,373 | 6/1983 | White et al. | 106/287.12 |
| 4,405,679 | 9/1983 | Fujioka | 428/216 |
| 4,442,168 | 4/1984 | White et al. | 428/331 |
| 4,477,499 | 10/1984 | Doin et al. | 427/412.1 |
| 4,500,669 | 2/1985 | Aschlock et al. | 524/440 |
| 4,505,974 | 3/1985 | Husler | 428/329 |
| 4,546,018 | 10/1985 | Ryuzo | 428/447 |
| 4,568,578 | 2/1986 | Arfsten et al. | 428/34 |
| 4,571,365 | 2/1986 | Aschlock et al. | 428/412 |

FOREIGN PATENT DOCUMENTS 0128697 12/1984 European Pat. Off. .
0170295 5/1986 European Pat. Off. .
1494209 12/1977 United Kingdom .

OTHER PUBLICATIONS

Physics of Thin Films, vol. 5, G. Haas and Re Thun eds., Ch. 3, Academic Press, 1969; H. Schroeder.
Klein et al., "Inhibition of Photoiniated Degradation of Polycarbonate by Cerium Silfate".
Smhidt, "New Materials for Contact Lens . . . Journal on Non-Crystalline Solids".

Primary Examiner—Theodore Morris
Attorney, Agent, or Firm—Donna L. Seidel

[57] ABSTRACT

An ultraviolet radiation resistant coating is disclosed comprising cerium oxide in an inorganic oxide matrix formed by the hydrolysis and condensation of an alkoxysilane and/or other metal alkoxide.

20 Claims, 1 Drawing Sheet

OPTICALLY TRANSPARENT UV-PROTECTIVE COATINGS

FIELD OF THE INVENTION

The present invention relates generally to protective coatings for plastics such as polycarbonate, and more particularly to coatings which protect the underlying substrate from damage caused by exposure to ultraviolet radiation.

BACKGROUND OF THE INVENTION

U.S. Pat. No. 4,275,118 to Baney et al discloses a coating composition comprising an acidic dispersion of colloidal titania, colloidal silica and hydroxylated silsesquioxane in an alcohol-water medium which produces a hard, abrasion-resistant coating when cured on a Plastic surface such as polycarbonate.

U.S. Pat. Nos. 4,390,373 and 4,442,168 to White et al disclose a cured transparent, abrasion resistant coating composition comprising an effective abrasion resisting amount of colloidal dispersion containing colloidal antimony oxide and colloidal silica in a weight rate of less than or equal to about 30:70 in a water-alcohol solution of the partial condensate of R (Si(OH)$_3$) wherein R is an organic radical.

U. S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. No. 4,477,499 to Doin et al discloses ultraviolet radiation resistant silicone resin coatings having improved thermoformability and shortened required aging achieved by the addition of a Lewis acid compound to the coating composition.

U.S. Pat. Nos. 4,500,669 and 4,571,365 to Ashlock et al disclose transparent, abrasion resistant coating compositions comprising a colloidal dispersion of a water insoluble dispersant in a water-alcohol solution of the partial condensate of silanol wherein the dispersant comprises metals, alloys, salts, oxides and hydroxides thereof.

European Patent Application No. 851102939 published 05.02.86 entitled "Carbon-Containing Monolithic Glasses Prepared by a Sol-Gel Process" by Baney et al of Dow Corning Corporation discloses a valuable intermediate which comprises a dispersion of a colloidal metal oxide in a water-alcohol solution of the partial condensate of a silanol having the formula RSi(OH)$_3$, wherein the metal oxide is $ZrO_2$, $SnO_2$, $ZrSiO_4$, $B_2O_3$ or $La_2O_3$.

Optical quality abrasion resistant coated plastic materials generally require a coating that protects the substrate from the damaging effects of ultraviolet (UV) radiation. Protection from ultraviolet radiation is especially important for polycarbonate, since hydrolytic degradation is apparently accelerated by UV exposure. Conventional UV stabilizers do not impart sufficient protective capacity to abrasion resistant coatings, as sufficient amounts of most typical organic UV absorbers cannot be added to abrasion resistant coatings without adversely affecting hardness and adhesion of the coating. Moreover, typical UV absorbers may gradually become deactivated after prolonged exposure, and also may gradually be leached from the composition.

In *Physics of Thin Films,* Vol. 5, in "Oxide Layers Deposited From Organic Solutions", Schroeder notes that titanium, cerium, antimony, and lead oxides deposited from organic solutions exhibit a steep rise of absorption in the near ultraviolet range of the radiation spectrum, and in the *Journal of Applied Polymer Science,* Vol. 26, in "Inhibition of Photoinitiated Degradation of Polycarbonate by Cerium (III) Overcoating," Klein et al disclose coating a polycarbonate substrate with cerous chloride ($CeCl_3$)/poly(viny alcohol) complex.

SUMMARY OF THE INVENTION

The present invention provides protection for underlying plastic substrates such as polycarbonate from damaging ultraviolet radiation by means of transparent coatings containing cerium oxide, a stable strongly ultraviolet absorbing species. The transparent cerium oxide containing UV protective coatings of the present invention are formed from aqueous sols containing colloidal cerium oxide in addition to alkoxides of silicon and/or other metals which hydrolyze and polymerize by condensation to form a film in which the cerium is incorporated in the oxide network of the coating.

DESCRIPTION OF THE PREFERRED EMBODIMENT

Figure 1:
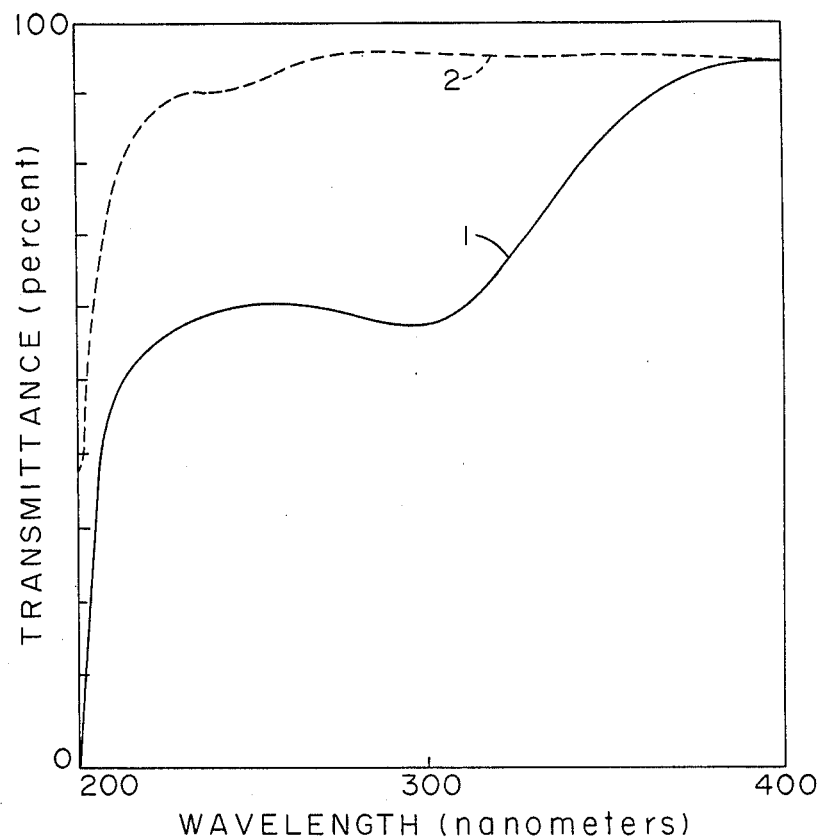
FIG. 1 illustrates the ultraviolet radiation absorption spectra of coatings with and without cerium oxide as described in Example IV.

Coatings that protect plastic substrates such as polycarbonate from damage caused by ultraviolet radiation are formed from aqueous sols containing colloidal cerium oxide and a network-forming metal alkoxide such as alkoxysilanes and other metal alkoxides. The alkoxysilane may be an organoalkoxysilane, such as an alkylalkoxysilane or organofunctional alkoxysilane. The alkoxide may contain alkyl or aryl groups and may be in dimer or higher condensed form so long as hydrolyzable alkoxide groups remain. The alkoxide may be added directly to an aqueous cerium oxide sol, with or without additional solvent such as alcohol. Hydrolysis and condensation polymerization occur in situ. Alternatively, the alkoxide may be partially or fully hydrolyzed, and condensed to some extent prior to combination with the cerium oxide sol.

The resulting silane/ceria sol may be used as a coating composition for either a primer or protective overcoat on a substrate or coated substrate. Or, the silane/ceria sol may be added to other coating compositions to increase their resistance to ultraviolet radiation. In either case, the coating compositions may be applied by any conventional technique, such as spraying, dipping or flow coating. The composition dries and cures to form a uniform durable coating with good adhesion to plastic substrates such as polycarbonate. The coating protects the substrate from ultraviolet radiation by providing a strong, broad absorption band in the 240 to 280 nanometer range.

In a preferred embodiment of the present invention, an alkoxide is partially hydrolyzed before adding an aqueous sol of colloidal cerium oxide. Preferably, the alkoxide is an alkoxysilane of the general formula $R_xSi(OR')_{4-x}$ wherein R is an organic radical, R' is selected from the group consisting of low molecular weight alkyl radicals, and x is less than 4 and may be zero. The organic radical of R is preferably alkyl, vinyl, methoxyethyl, phenyl, γ-glycidoxypropyl, or γ-methacryloxypropyl. The alkoxide hydrolyzes according to the general reaction $$R_xSi(OR')_{4-x} + yH_2O \rightarrow R_xSi(OR')_{4-x-y}(OH)_y + yR'OH$$

Condensation of the hydrolyzed alkoxide proceeds according to the general reactions $$2R_xSi(OR')_{4-x-y}(OH)_y \longrightarrow \begin{array}{c} R_xSi(OR')_{4-x-y}(OH)_{y-1} \\ | \\ O \\ | \\ R_xSi(OR')_{4-x-y-1}(OH)_y \end{array} + R'OH$$

or $$2R_xSi(OR')_{4-x-y}(OH)_y \longrightarrow \begin{array}{c} R_xSi(OR')_{4-x-y}(OH)_{y-1} \\ | \\ O \\ | \\ R_xSi(OR')_{4-x-y}(OH)_{y-1} \end{array} + H_2O$$

Further hydrolysis and condensation follow.

The pH and/or degree of condensation of the alkoxides may be adjusted, if necessary, to prevent haze or precipitation upon mixing with the ceria sol. The cerium oxide sol preferably comprises about 10 to 30 percent by weight colloidal cerium oxide in water, with the colloidal cerium oxide particle size sufficiently small to minimize scattering of visible light, preferably less than 30 to 40 nanometers, most preferably less than 10 nanometers. Alkoxides of titanium and/or zirconium may also be included in compositions of the present invention, as well as colloidal silica for abrasion resistance. The ultraviolet radiation protection provided by the cerium oxide containing coating of the present invention may be determined by measuring the UV absorbance spectrum of the coating applied on a quartz substrate.

The present invention will be further understood from the description of specific examples which follow.

EXAMPLE I

A silane/ceria/silica coating which is both abrasion-resistant and ultraviolet radiation resistant is prepared as follows. An organoalkoxysilane composition is prepared by combining 200 grams of methyl triethoxysilane and 20 grams of dimethyl diethoxysilane. To the organoalkoxysilane are added 120 grams of a colloidal dispersion of silica containing 30 percent by weight of colloidal silica having an average particle size of 13 to 14 nanometers, and 7 grams of glacial acetic acid. This composition is stirred for 3 days to hydrolyze the organoalkoxysilane. The hydrolyzed organoalkoxysilane composition is diluted with 75 grams of iso-butanol. To 50 grams of the diluted hydrolyzed organoalkoxysilane is added 5 grams of an aqueous colloidal dispersion of cerium oxide containing 18 percent by weight colloidal cerium oxide having an average particle size of 5 to 15 nanometers. The sol is adjusted to pH of 5.5 to 6 with 10 drops of triethylamine, and stirred for half an hour at room temperature.

Polycarbonate substrates are primed by dipping for 1 minute in SP-1 acrylic primer from Exxene Chemical Co., drying and curing for 30 minutes at 60° C. to 80° C. Primed polycarbonate substrates are then dipped into the above coating composition for 1 minute, air-dried for half an hour, then cured by heating from 40° C. to 120° C. over a period of one hour and holding at 120° C. for 2 hours. A coating is formed having a thickness of about 6.5 microns. After cooling to ambient temperature, the coated polycarbonate is exposed to ultraviolet radiation in Q-UV testing for 425 hours. The result is a yellowness index change of 2 compared with a change of 10 for a comparable silane/silica coating without cerium oxide.

EXAMPLE II

An abrasion resistant, UV-protective coating for polycarbonate is prepared by stirring a solution of 30 grams of water, 25 grams of methanol, 2 grams of aqueous formaldehyde, and 3 grams of polyvinylalcohol (PVA, mw approx. 360,000) at room temperature for 30 minutes. A second solution comprising 80 grams of methyl trimethoxysilane ($CH_3Si(CH_3)_3$), 8 grams of dimethyl diethoxysilane (($CH_3)_2Si(C_2H_5)_2$), and 3 drops of trifluoroacteic acid is added to the first solution, and stirring is continued for 1 hour. After 24 hours at 40° F. (about 4.4° C.), 5 grams of an aqueous cerium oxide sol is added to 50 grams of the silane composition and stirred for 30 minutes at room temperature. The cerium oxide sol contains 20 percent by weight of cerium oxide particles having a mean particle size of 5 nanometers.

A primer that provides good adhesion of the UV-protective abrasion resistant coating to polycarbonate is prepared by dissolving 1.9 grams of Cyabsorb 5411, a benzophenone derivative UV absorber from American Cyanamid, in 300 grams of SP1 acrylic primer from Exxene Chemical Co. at room temperature. Clean, dry 12″×13″×⅛″ (about 30.5 by 33 by 0.3 centimeters) polycarbonate sheets are dipped in the primer solution for 1 minute, withdrawn at a rate of about 8 inches (about 20.3 centimeters) per minute, air-dried for 30 minutes and cured in an oven at 60° C. for 30 minutes.

The silane-ceria coating was applied at 45% relative humidity by dipping the primed polycarbonate sheet in the silane/ceria coating solution for 1 minute, withdrawing at a rate of about 8 inches (about 20.3 centimeters) per minute, air-drying at room temperature for 15 minutes, and curing at 120° C. for 3 hours.

Figure 2:
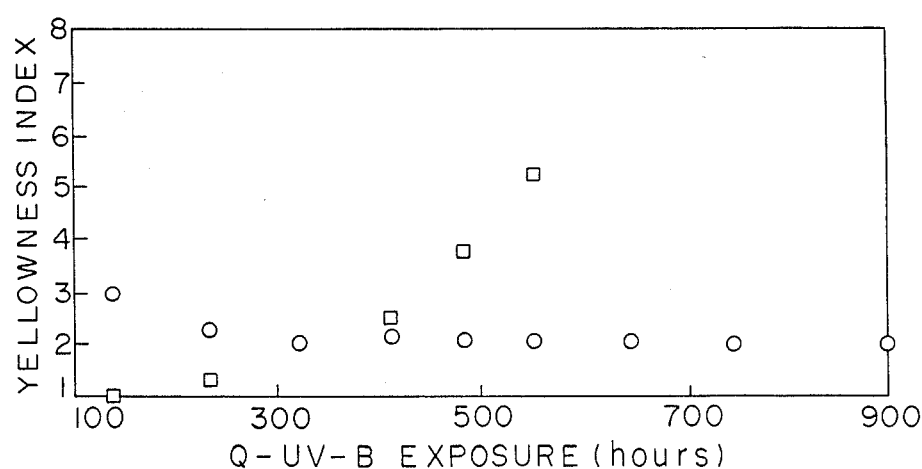
FIG. 2 illustrates the increase in yellowness index as a function of ultraviolet radiation exposure time for coatings with and without cerium oxide as described in Example II.

After 900 hours of QUV-B testing, the yellowness index of the coated polycarbonate did not significantly increase. For comparison, the same coating composition, except without cerium oxide, is coated on polycarbonate and likewise exposed to QUV-B testing. The yellowness index begins to increase substantially starting after about 400 hours of exposure. This effect of cerium oxide in an optically transparent abrasion resistant coating in preventing yellowing of the coated polycarbonate during accelerated long term exposure to UV radiation is illustrated in FIG. 2.

EXAMPLE III

Thirty grams of water and 20 grams of 20% aqueous colloidal cerium oxide ($CeO_2$) were combined and heated to 70° C. After adding 1.5 grams of poly vinyl alcohol and 2 grams of 37% formaldehyde in water, the temperature was lowered to 60° C., and 25 grams of reagent grade ethanol and 15 grams of tetraethylorthosilicate (TEOS) were added with stirring. The reaction was continued with stirring at 60° C. for 2 hours, giving a clear coating solution.

This coating solution was applied to quartz and cured for 15 minutes at 120° C. The UV absorbance spectrum of the coated glass demonstrates that the coating begins to absorb at 420 nanometers and effectively blocks 100% of the UV radiation at wavelengths less than 341 nanometers.

EXAMPLE IV

Twenty grams of γ-glycidoxypropyl trimethoxysilane, 2 grams of 18% aqueous colloidal ceria and 2 drops of trifluoroacetic acid are combined and stirred at room temperature for 4 hours. Ten grams of ethylene glycol monomethylether and 1 gram of zirconium tetra-n-propoxide are added as stirring is continued for 30 minutes. An additional 10 grams of aqueous ceria is added. A quartz substrate is coated by dipping in the composition. After curing the coating, the UV absorbance spectrum shows that the coating begins to absorb UV radiation at about 390 nanometers and reduces UV transmission below 290 nanometers by 40% as shown in FIG. 1. Without cerium oxide, the formulation gives a coating that is nearly completely UV-transparent, i.e., more than 95 percent transmission, as also shown in FIG. 1.

The above examples are offered to illustrate the present invention. Various hydrolyzable alkoxides and cerium oxide compositions may be combined in a wide range of proportions and concentrations, so long as there is sufficient alkoxide to form an oxide network and sufficient cerium oxide to provide desired improvement in ultraviolet radiation resistance, as measured by the UV absorbance spectrum of the coating on a quartz substrate. Cerium oxide containing coatings are useful on a variety of substrates in accordance with the present invention, the scope of which is defined by the following claims.

We claim:
1. An optically transparent coating composition which reduces transmission of ultraviolet radiation consisting essentially of:
   a. a partially hydrolyzed alkoxide of the general formula $R_xM(OR')_{z-x}$ wherein R is an organic radical, M is selected from the group consisting of silicon, aluminum, titanium, zironium and mixtures thereof, R' is a low molecular weight alkyl radical, z is the valence of M and x is less than z and may be zero; and
   b. colloidal cerium oxide.
2. A composition according to claim 1, wherein said alkoxide comprises the general formula $R_xSi(OR')_{4-x}$ and R' is selected from the group consisting of methyl, ethyl, propyl, and butyl.
3. A composition according to claim 2 wherein R is selected from the group consisting of alkyl, vinyl, phenyl, methoxyethyl, γ-glycidoxypropyl and γ-methacryloxypropyl, and x is 1.
4. A composition according to claim 3, wherein said alkoxide comprises methyl triethoxysilane.
5. A composition according to claim 3, wherein said alkoxide comprises γ-glycidoxypropyl trimethoxysilane.
6. A composition according to claim 1, wherein said cerium oxide comprises colloidal particles in aqueous dispersion.
7. A composition according to claim 6, wherein said particles have an average particle size of less than 10 nanometers.
8. A composition according to claim 1, further comprising silica.
9. A composition according to claim 8, wherein said silica comprises colloidal particles in aqueous dispersion.
10. A composition according to claim 9, wherein said silica particles have an average particle size of 10 to 20 nanometers.
11. A method of preparing an optically transparent ultraviolet resistant coating composition comprising the steps of:
    a. at least partially hydrolyzing an alkoxide of the general formula $R_xM(OR')_{z-x}$ wherein R is an organic radical, M is selected from the group consisting of silicon, aluminum, titanium, zirconium and mixtures thereof, R' is a low molecular weight alkyl radical, z is the valence of M and x is less than z and may be zero; and
    b. adding to said at least partially hydrolyzed alkoxide a colloidal dispersion of cerium oxide.
12. A method according to claim 11, wherein said alkoxide comprises the general formula $R_xSi(OR')_{4-x}$ and R' is selected from the group consisting of methyl, ethyl, propyl and butyl.
13. A method according to claim 12, wherein R is selected from the group consisting of alkyl, vinyl, phenyl, methoxyethyl, γ-glycidoxypropyl and γ-methacryloxypropyl, and x is 1.
14. A method according to claim 13, wherein said alkoxide comprises methyl triethoxysilane.
15. A method according to claim 13, wherein said alkoxide comprises -glycidoxypropyl trimethoxysilane.
16. A method according to claim 11, wherein said cerium oxide comprises colloidal particles in aqueous dispersion.
17. A method according to claim 16, wherein said particles have an average particle size of 5 to 15 microns.
18. A method according to claim 11, further comprising the step of adding silica to said partially hydrolyzed alkoxide.
19. A method according to claim 18, wherein said silica comprises colloidal particles in aqueous dispersion.
20. A method according to claim 19, wherein said silica particles have an average particle size of 10 to 20 microns.

* * * * *